(12) United States Patent
Park et al.

(10) Patent No.: US 10,915,744 B2
(45) Date of Patent: Feb. 9, 2021

(54) METHOD FOR EVALUATING FASHION STYLE USING DEEP LEARNING TECHNOLOGY AND SYSTEM THEREFOR

(71) Applicant: FEELINGKI. Co., Ltd., Seoul (KR)

(72) Inventors: Ji Hyeon Park, Seoul (KR); Hyo Yun Lee, Gyeonggi-do (KR)

(73) Assignee: FEELINGKI. CO., LTD, Seoul (KR)

( * ) Notice: Subject to any disclaimer, the term of this patent is extended or adjusted under 35 U.S.C. 154(b) by 109 days.

(21) Appl. No.: 16/201,423

(22) Filed: Nov. 27, 2018

(65) Prior Publication Data

US 2020/0117890 A1    Apr. 16, 2020

(30) Foreign Application Priority Data

Oct. 10, 2018  (KR) .......................... 10-2018-0120490

(51) Int. Cl.
*G06T 7/90* (2017.01)
*G06K 9/00* (2006.01)
*G06N 20/20* (2019.01)
*G06K 9/32* (2006.01)

(52) U.S. Cl.
CPC ....... *G06K 9/00369* (2013.01); *G06K 9/3241* (2013.01); *G06N 20/20* (2019.01); *G06T 7/90* (2017.01)

(58) Field of Classification Search
CPC ............. G06K 9/00369; G06K 9/3241; G06K 9/6256; G06K 9/6232; G06T 7/90; G06N 20/20; G06N 3/08; G06N 3/04

USPC ........ 382/100, 155, 162, 165; 700/130, 131, 700/132, 275
See application file for complete search history.

(56) References Cited

U.S. PATENT DOCUMENTS

| | | | | |
|---|---|---|---|---|
| 9,953,217 B2 * | 4/2018 | Feris | ................... | G06K 9/00369 |
| 10,052,026 B1 * | 8/2018 | Tran | ........................ | G06T 15/20 |
| 10,109,051 B1 * | 10/2018 | Natesh | ................. | G06K 9/4652 |
| 10,262,432 B1 * | 4/2019 | Keilholz | ................... | G06T 7/62 |
| 10,321,728 B1 * | 6/2019 | Koh | .......................... | G06T 7/11 |
| 10,593,023 B2 * | 3/2020 | Chang | .................... | G06K 9/036 |
| 2008/0262944 A1 * | 10/2008 | Wu | ..................... | G06Q 30/0643 705/27.2 |

(Continued)

*Primary Examiner* — Sheela C Chawan
(74) *Attorney, Agent, or Firm* — Moser Taboada

(57) ABSTRACT

Deep learning-based clothing style evaluation method and system are provided. According to the present invention, a deep learning-based clothing style evaluation method comprises receiving at least one image provided by a user terminal, analyzing objects included in the at least one image and extracting a plurality of fashion features related to a user using deep learning algorithm when the user exists in the object, extracting matching information between the extracted plurality of fashion features using deep learning algorithm, evaluating a clothing style of the user based on the matching information, and transmitting an evaluation result to the user terminal, wherein the fashion feature is one of the number of clothing worn by the user, type of clothing, color of clothing, style of clothing, skin tone of the user, and other information affecting fashion style, and wherein the matching information comprises essentially of matching information between the skin tone of the user and any one of the fashion features other than the skin tone.

15 Claims, 8 Drawing Sheets
(8 of 8 Drawing Sheet(s) Filed in Color)

(56) References Cited

U.S. PATENT DOCUMENTS

2014/0022238 A1* 1/2014 Oh .................... G06Q 30/0601
345/419
2019/0236677 A1* 8/2019 Anusha ............. G06Q 30/0631

* cited by examiner

| Evaluation Item | The Number of Clothing: N (E: The Number of Evaluation Items) | Exemplary Evaluation Score |
|---|---|---|
| Item 1: the number of clothing having a color matching the skin tone (a) | (a/N) * (1/E) * 100 | (3/5) * (1/3) * 100 = 20 |
| Item 2: the number of color matches between the clothing (b) | (b/N) * (1/E) * 100 | (3/5) * (1/3) * 100 = 20 |
| Item 3: the total number of styles of the clothing (c) | (N − c + 1)/N * (1/E) * 100 | (5 − 3 + 1)/5 * (1/3) * 100 = 20 |
| | = Total Score | = 60 points |

FIG. 7

METHOD FOR EVALUATING FASHION STYLE USING DEEP LEARNING TECHNOLOGY AND SYSTEM THEREFOR

RELATED APPLICATIONS

This application claims priority to Korean Application Serial Number 10-2018-0120490, filed Oct. 10, 2018, which is herein incorporated by reference in its entirety.

BACKGROUND

Field of Invention

The present invention relates to a clothing style evaluation using a telecommunication network, and more particularly, to a method and system for evaluating a clothing style on an image of a person wearing clothing.

Description of Related Art

In addition to its essential functions such as maintaining body temperature and protecting skin, clothing also has a function as a means of self-expression. People protect their bodies by wearing clothes to adapt to climate change and express their personality by dressing to suit themselves. When these functions of clothing are effectively exercised in the attire of everyday life, it is possible to enjoy physically pleasant and psychologically satisfactory lifestyle.

The combination of clothes is countless. Finding a combination that suits me in the floods of the clothes is a pleasure, and at the same time is often stressful.

It is already well known to seek advice and appreciation of clothing styles from other users or experts using a telecommunication network such as the Internet.

Korean Patent Application Laid-Open No. 10-2016-0144277 (published on Dec. 16, 2016) discloses a method for providing a clothing coordination service comprising the steps of transmitting user fashion information to an externally-linked server through a user terminal, receiving evaluation/recommendation information on the user's fashion information, and providing a customized clothing coordination service, wherein the externally-linked server corresponds to an online community or a makeup/fashion experts group.

Korean Patent No. 10-2009-0095532 (published on Sep. 9, 2009) discloses a comprehensive fashion coordination information providing system based on the Internet, which connects a user who wants a fashion coordination service with a professional coordinator having a career of providing fashion advices to a famous person, provides fashion coordination information based on personal information such as the user's photograph, physical information, and a preferred color provided by the user, and provides a clothing coordination service through a video conversation.

In this regard, app-type services implemented in smartphones and the like were introduced. The clothing coordination rating app, 'Otgeori,' which is downloadable from the Google Play Store, provides a service that allows users to upload their photos on the app and receive ratings from other users.

Likewise, 'Otjang', a downloadable app from the Google Play Store, provides freestyle coordinating/shopping application services using virtual objects (avatars). The app allows users to select their desired virtual objects and link coordinated clothing to shopping malls. In addition, apps such as 'Codicon' have been launched, which allow users to coordinate virtual clothing with virtual objects and receive ratings from other users. However, these apps have a disadvantage in that the physical features of the actual user are not taken into consideration since the apps evaluate virtual clothing coordinated on the virtual objects.

The above-described conventional techniques are useful in that they can provide a clothing coordination service remotely by utilizing a telecommunication network, but intervention of other persons, that is, other users or professional coordinators, is essential for style evaluation. Therefore, it takes a considerable time to evaluate, and additional costs such as personnel expenses may be incurred.

In addition, it is difficult to guarantee the objectivity and consistency of the evaluation conducted by other people because each person has a preference and a different standard of judgment.

In order to provide objective and immediate feedback on a user's clothing style using a telecommunication network, it is the most efficient way to provide a system that can perform consistent evaluation while excluding human intervention in the individual evaluation process. However, prior arts could not suggest such a solution.

An object of the present invention is to provide a method and system for evaluating a clothing style that can provide an objective evaluation result by excluding human intervention in a clothing style evaluation process using a telecommunication network.

Another object of the present invention is to provide a method and system for evaluating a clothing style that can automate clothing style evaluation system while providing a satisfactory and reliable evaluation result.

Another object of the present invention is to provide a method and system for evaluating a clothing style that can provide an evaluation result in consideration of factors such as a skin tone that may affect the clothing style.

The problems to be solved by the present invention are not limited to the above-mentioned problems, and other problems not mentioned can be clearly understood by a person having ordinary skill in the art from the following description.

SUMMARY

In order to achieve the above objects, according to an aspect of the present invention, there is provided a deep learning-based clothing style evaluation method comprising receiving at least one image provided by a user terminal, analyzing objects included in the at least one image and extracting a plurality of fashion features related to a user using deep learning algorithm when the user exists in the object, extracting matching information between the extracted plurality of fashion features using deep learning algorithm, evaluating a clothing style of the user based on the matching information, and transmitting an evaluation result to the user terminal, wherein the fashion feature is one of the number of clothing worn by the user, type of clothing, color of clothing, style of clothing, skin tone of the user, and other information affecting fashion style, and wherein the matching information comprises essentially of matching information between the skin tone of the user and any one of the fashion features other than the skin tone.

According to another aspect of the present invention, there is provided a deep learning-based clothing style evaluation method, wherein the matching information includes matching information between the color of the clothing worn by the user and the skin tone of the user.

According to yet another aspect of the present invention, there is provided a deep learning-based clothing style evaluation method, wherein the matching information includes matching information between colors of two or more pieces of clothing worn by the user.

According to yet another aspect of the present invention, there is provided a deep learning-based clothing style evaluation method, wherein the matching information includes information on the style of the clothing worn by the user.

According to yet another aspect of the present invention, there is provided a deep learning-based clothing style evaluation method, wherein the extracting of the skin tone includes classifying the user's skin tone according to a predetermined skin tone classification criterion and retrieving at least one color group matching the extracted skin tone.

According to yet another aspect of the present invention, there is provided a deep learning-based clothing style evaluation method, wherein the extracting of the matching information between the color of the clothing worn by the user and the user's skin tone is performed by comparing the color of the clothing worn by the user with the color group matching the extracted skin tone.

According to yet another aspect of the present invention, there is provided a deep learning-based clothing style evaluation method, wherein the extracting of the matching information between the colors of two or more pieces of clothing worn by the user is accomplished by determining whether a tone-on-tone or tone-in-tone matching exists based on a color of one piece of clothing designated from the clothing worn by the user in a predetermined color chart.

According to yet another aspect of the present invention, there is provided a deep learning-based clothing style evaluation method, wherein the evaluating of the clothing style includes calculating a total score by putting one or more of the number of clothing having a color matching the skin tone, the number of colors matches between clothing and the total number of clothing styles into a predetermined equation.

According to yet another aspect of the present invention, there is provided a deep learning-based clothing style evaluation method, wherein the predetermined equation is, Total score=$\{(a/N)\times(1/E)\times100\}+\{(b/N)\times(1/E)\times100\}+\{(N-c+1)/N\times(1/E)>100\}$, where N: the number of clothing worn by a user, E: the number of evaluation items, a: the number of clothing having a color matching a skin tone of a user, b: the number of color matches between clothing worn by the user, and c: the total number of styles of clothing worn by the user.

According to yet another aspect of the present invention, there is provided a deep learning-based clothing style evaluation method, further comprising extracting a recommended clothing using deep learning algorithm based on the evaluation result or at the request of the user, and transmitting the recommended clothing to the user terminal.

According to yet another aspect of the present invention, there is provided a deep learning-based clothing style evaluation method, wherein the extracting of the recommended clothing includes loading a tone-on-tone matching color group and a tone-in-tone matching color group in a predetermined color chart based on a color of one piece of clothing designated from the clothing worn by the user, selecting at least one recommended color by comparing the color groups with a color group matching the skin tone of the user, and selecting a most frequent style among the styles of the clothing worn by the user as a recommended clothing style.

According to an aspect of the present invention, there is provided a deep learning-based clothing style evaluation system comprising a server receiving at least one image provided by a user terminal, and a deep learning unit linked to the server, wherein the deep learning unit analyzes an object included in the at least one image, extracts a plurality of fashion features related to a user by using deep learning algorithm when the user exists in the object, extracts matching information between the plurality of fashion features, and evaluates clothing style of the user based on the matching information, wherein the fashion feature is one of the number of clothing worn by the user, type of clothing, color of clothing, style of clothing, skin tone of the user, and other information affecting fashion style, and wherein the matching information comprises essentially of matching information between the skin tone of the user and any one of the fashion features other than the skin tone.

According to another aspect of the present invention, there is provided a deep learning-based clothing style evaluation system, wherein the matching information includes matching information between the color of the clothing worn by the user and the skin tone of the user.

According to yet another aspect of the present invention, there is provided a deep learning-based clothing style evaluation system, wherein the matching information includes matching information between colors of two or more pieces of clothing worn by the user.

According to yet another aspect of the present invention, there is provided a deep learning-based clothing style evaluation system, wherein the matching information includes information on the style of the clothing worn by the user.

According to yet another aspect of the present invention, there is provided a deep learning-based clothing style evaluation system, wherein extracting of the skin tone includes classifying the user's skin tone according to a predetermined skin tone classification criterion and retrieving at least one color group matching the extracted skin tone.

According to yet another aspect of the present invention, there is provided a deep learning-based clothing style evaluation system, wherein the extracting of the matching information between the color of the clothing worn by the user and the user's skin tone is performed by comparing the color of the clothing worn by the user with the color group matching the extracted skin tone.

According to yet another aspect of the present invention, there is provided a deep learning-based clothing style evaluation system, wherein the extracting of the matching information between the colors of two or more pieces of clothing worn by the user is accomplished by determining whether a tone-on-tone or tone-in-tone matching exists based on a color of one piece of clothing designated from the clothing worn by the user in a predetermined color chart.

According to yet another aspect of the present invention, there is provided a deep learning-based clothing style evaluation system, wherein the evaluating of the clothing style includes calculating a total score by putting one or more of the number of clothing having a color matching the skin tone, the number of colors matches between clothing and the total number of clothing styles into a predetermined equation.

According to yet another aspect of the present invention, there is provided a deep learning-based clothing style evaluation system, wherein the predetermined equation is, Total score=$\{(a/N)\times(1/E)\times100\}+\{(b/N)\times(1/E)\times100\}+\{(N-c+1)/N\times(1/E)\times100\}$, where N: the number of clothing worn by a user, E: the number of evaluation items, a: the number of clothing having a color matching the user's skin tone, b: the number of color matches between the clothing worn by the user, and c: the total number of styles of the clothing worn by the user.

According to yet another aspect of the present invention, there is provided a deep learning-based clothing style evaluation system, further comprising extracting a recommended clothing using deep learning algorithm based on the evaluation result or at the request of the user, and transmitting the recommended clothing to the user terminal.

According to yet another aspect of the present invention, there is provided a deep learning-based clothing style evaluation system, wherein the extracting of the recommended clothing includes loading a tone-on-tone matching color group and a tone-in-tone matching color group in a predetermined color chart based on the color of one piece of clothing designated from the clothing worn by the user, selecting at least one recommended color by comparing the color groups with a color group matching the skin tone of the user, and selecting a most frequent style among the styles of the clothing worn by the user as a recommended clothing style.

Since the present invention uses a deep learning technology, a human intervention is not necessary for the clothing style evaluation, so that an objective and consistent evaluation can be provided. In addition, since there is no need to wait for human intervention, immediate evaluation is possible.

In addition, since the intervention of a person such as an expert is excluded in the clothing style evaluation, it can be expected to reduce labor costs.

Furthermore, since it is possible to adjust the basic input information for deep learning in consideration of the feedback of users, a more satisfactory evaluation result could be provided to the users.

The effects of the present invention are not limited to the effects mentioned above, and other effects not mentioned can be clearly understood by a person having ordinary skill in the art from the following description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7 illustrates an exemplary equation for calculating an evaluation score according to each evaluation item, according to an embodiment of the present invention.

DETAILED DESCRIPTION

Figure 1:
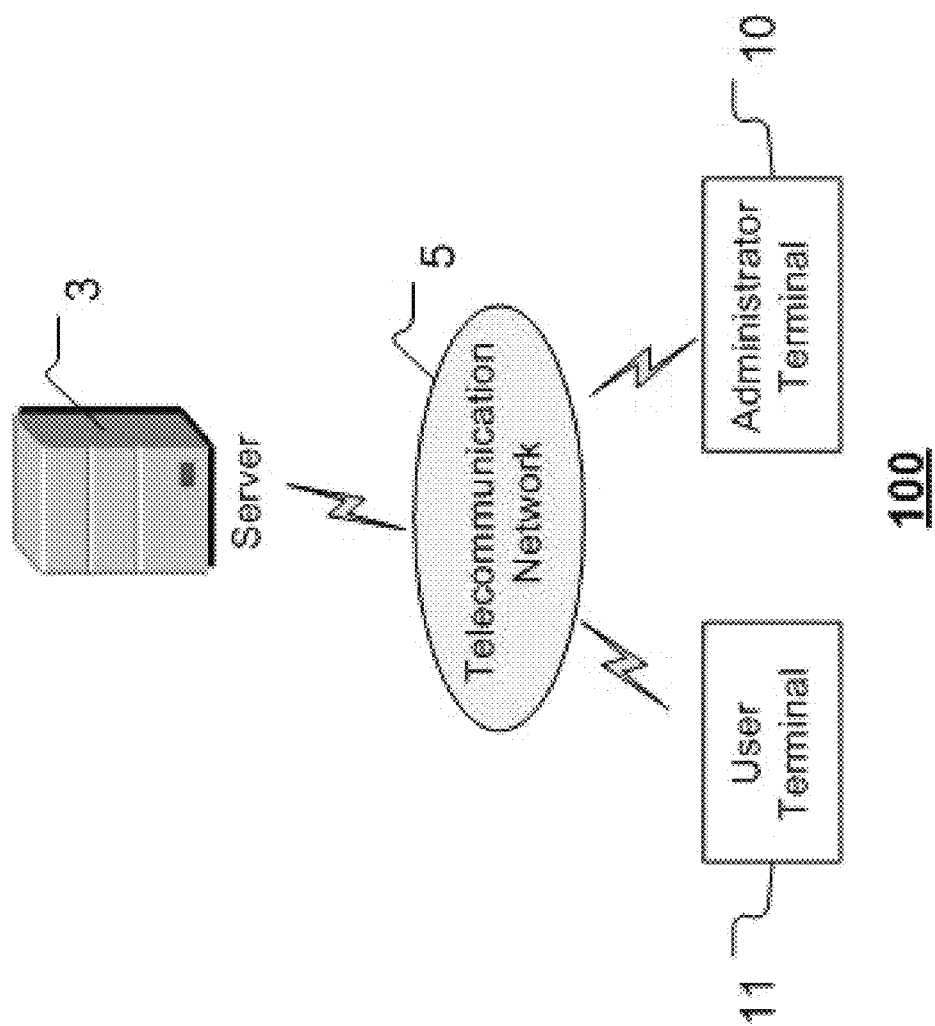
FIG. 1 illustrates a clothing style evaluation system according to an embodiment of the present invention.

The embodiments shown in the attached drawings are for a clear understanding of the present invention, and the present invention is not limited thereto. In the following description, components having the same reference numerals in different drawings have similar functions, so that they will not be described repeatedly unless necessary for understanding of the invention. The known components will be briefly described or omitted. However, it should not be understood as being excluded from the embodiments of the present invention.

A 'telecommunication network' used throughout the present specification refers to a set of terminals, links, or nodes connected for the purpose of enabling communication between terminal users, and is a concept encompassing a computer network, the Internet, and a telephone network.

In the present specification, 'clothing' or 'clothes' is used not only as a top, bottoms, and a coat, but also a concept covering any product made of cloth, leather or the like that can be worn on a person's body, such as a hat or a shoe. Also, the expression 'matched' between clothing, between a physical feature and clothing, and so on is used to indicate to be harmonized and fit in terms of fashion coordination.

In order to evaluate the clothing style according to the present invention, information affecting the clothing style (for example, skin tone) in addition to the information about the clothing of the user is required. The term 'fashion features' is used to refer to such information comprehensively.

In the following, embodiments of a method and system for evaluating a clothing style based on deep learning according to the present invention will be described in detail with reference to the accompanying drawings.

FIG. 1 illustrates a clothing style evaluation system 100 according to an embodiment of the present invention.

As shown in FIG. 1, a user terminal 11, an administrator terminal 10 and a server 3 are connected via a telecommunication network 5 in the clothing style evaluation system 100 of the present invention. The server 3 can exchange data with the user terminal 11 via the wired/wireless telecommunication network 5, and the administrator terminal 10 can be connected to the server 3 directly or remotely via the telecommunication network.

Figure 2:
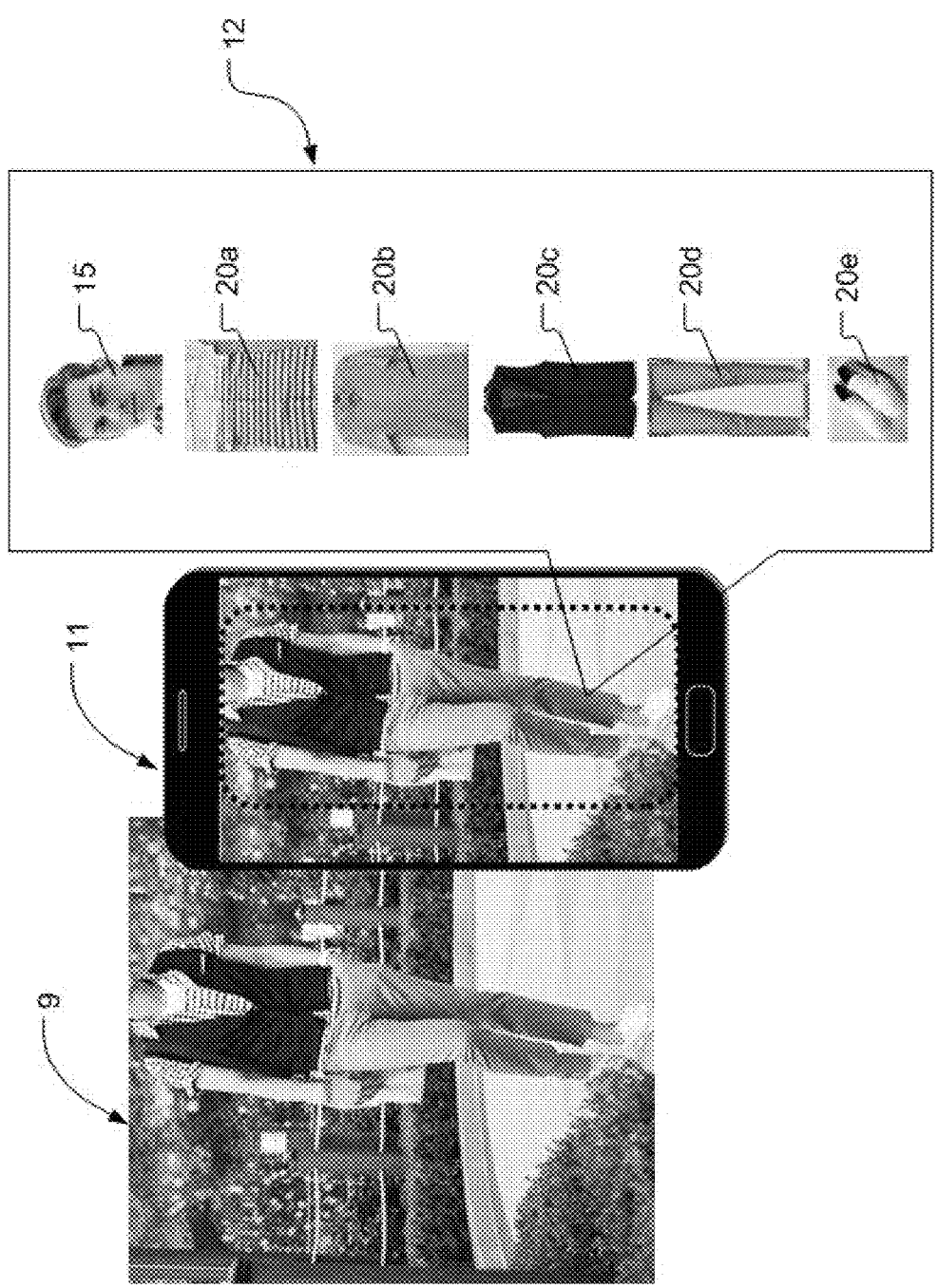
FIG. 2 illustrates extraction of fashion features such as a user's skin tone, clothing worn by the user, etc. from an image of a user wearing clothes, according to an embodiment of the present invention.

FIG. 2 schematically illustrates an embodiment of a method of recognizing a user's face, clothing worn by the user, etc. from an image of a user wearing clothes.

The user may upload an image of the clothing wearing state 9 photographed by the user terminal 11, by using a solution such as a smartphone app for providing clothing style evaluation service according to the present invention. The uploaded image is input to the server 3 on the service provider side, and the user's face and clothing worn by the user are then recognized separately using a software, for example, a face recognition software or a clothing recognition software, which is installed on or linked with the server 3 and capable of recognizing the existence of a person, a face, clothing, etc. from an image. For example, Google has released a face recognition software in 2012, and Microsoft Azure®, which is available on the market, implements the function of detecting a human face in an image. The above-mentioned software may be software based on deep learning as described below.

Specifically, when an image is uploaded to the server, the object included in the image is then analyzed. When a person, that is, a user exists in the object, the user's face, clothing worn by the user and the like are separated and recognized through the above-described software.

In addition, the fashion features 12 are extracted from the separated and recognized information using a deep learning algorithm.

Conventionally, the acquired image is compared only with the pre-stored images, so that only a typical pattern recognition is applied to the acquired image, and there is a limitation that it cannot cope with images of various types of data.

Deep learning is a generic term for machine learning algorithms that use deep hierarchical artificial neural networks.

Deep learning teaches a computer to distinguish objects through a process imitating the information processing way of the human brain which finds patterns in a large number of data and discerns objects. In addition, deep learning enables a machine to cluster or classify the discerned data.

Deep learning technology makes it possible for a computer to perceive, reason, and judge by itself without having to set all standard of judgment, so it can be widely used for voice or image recognition, photo analysis, etc.

Depending on how the data is categorized, many machine learning algorithms have developed, including decision trees, Bayesian networks, support vector machines, artificial neural networks, etc.

Deep learning is derived from artificial neural networks.

An artificial neural network refers to a statistical learning algorithm that is inspired by the biological neural network (animal's central nervous system). Specifically, it refers to all models in which artificial neuron (node) that forms a network by the synapse combination changes the combining strength of synapses so as to have the ability to solve problems.

The core of deep learning using artificial neural networks is prediction through classification.

As human discerns things by finding patterns in a lot of data, the computer divides data.

Like other machine learning to learn from data, neural networks are used to solve a wide range of problems, such as computer vision or voice recognition, which are generally difficult to solve with rule-based programming.

A lot of research has been conducted to express given data as a form in which the computer can recognize (for example, a tool that expresses pixel information as a column vector in an image) and applies it to learning. As a result, various deep learning techniques such as deep neural networks, convolutional neural networks, and recurrent neural networks are used in computer vision, speech recognition, natural language processing, voice/signal processing, etc., and applications of high performance are being developed.

The fashion features extracted through the above-described deep learning algorithm according to an embodiment of the present invention may include the skin tone of the user, the type, number, color, length, pattern, style and the like of the clothing worn by the user. Types of clothing can be classified in detail such as shirts, short sleeves, suit vests, slacks, slip-on shoes, and so on. The style of clothing can be selected from various styles such as natural look, vintage look, modern look, sporty look, outdoor look, dandy look, military look, school look, etc.

Referring to FIG. 2, the fashion features 12 relating to the user's skin tone 15 and the clothes 20a, 20b, 20c, 20d and 20e worn by the user are extracted. Specifically, a red stripped short-sleeved T-shirt 20a, a blue short sleeves check shirt 20b, a dark blue suit vest 20c, a gray slim fit slacks 20d, and white slip-on shoes 20e were extracted with respect to the clothing worn by the user.

In the following, a method of extracting the fashion features with respect to the user's skin tone 15 will be described in detail with reference to FIG. 3.

Since the skin tones can be classified into various types, the classification standard to be applied is determined in advance. In the present embodiment, the following four classification standards, which are widely used, were adopted.

1. Spring warm tone—yellow based warm color, white or yellow tone, peach light;
2. Summer cool tone—white and red tone;
3. Autumn warm tone—the most yellowish tone, pasty complexion; and
4. Winter cool tone—pale or translucent skin.

The color groups M1, M2, M3, and M4 matched respectively to each skin tone classified according to the above standards are known. These color groups are classified according to the tone of the color, that is, the difference in the saturation and the brightness. The classification according to the tone difference will be described in detail below.

It is not necessary that the skin tone of a specific user is necessarily classified as one type, and it is also possible to judge the skin tone based on the other skin region without being limited to the face. In order to increase the consistency of the skin tone classification, it is possible to provide guidelines on the photographing condition such as the lighting state when photographing an image or to directly input, e.g., through the smartphone app, the photographing environment such as indoor, outdoor, sunny or cloudy.

Further, in sorting the skin tones, additional information such as eye color or hair color can be additionally considered. For example, information such as: 1. Spring worm tone—Eyes: light brown, Hair: brown or orange; 2. Summer cool tone—Eyes: cloudy gray, Hair: dark brown or grayish brown; 3. Autumn warm tone—Eyes: dark brown, Hair: dark brown; 4. Winter cool tone—Eyes: the white is blue and the pupil is deep and clear, Hair: bluish dark brown or black, can be considered.

Figure 3:
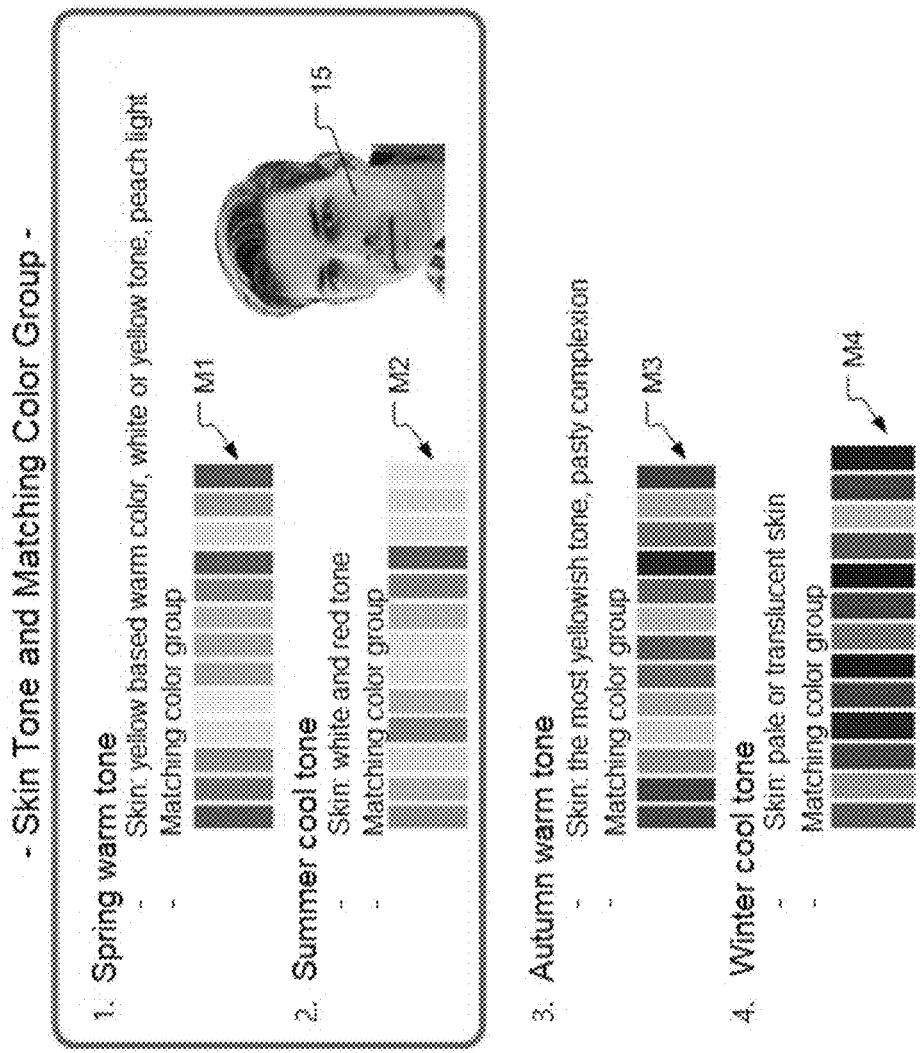
FIG. 3 illustrates a method of recognizing a user's skin tone in FIG. 2 in detail.

In this embodiment, the skin tone 15 of the user is classified by the deep learning algorithm to correspond to 1. spring warm tone and 2. summer cool tone (marked by the square of FIG. 3). Thus, the colors that match the skin tone 15 are those included in the color groups M1 and M2.

The fashion features of the user can be extracted as described above.

Now, a method of extracting matching information between the extracted fashion features will be described.

Figure 4:
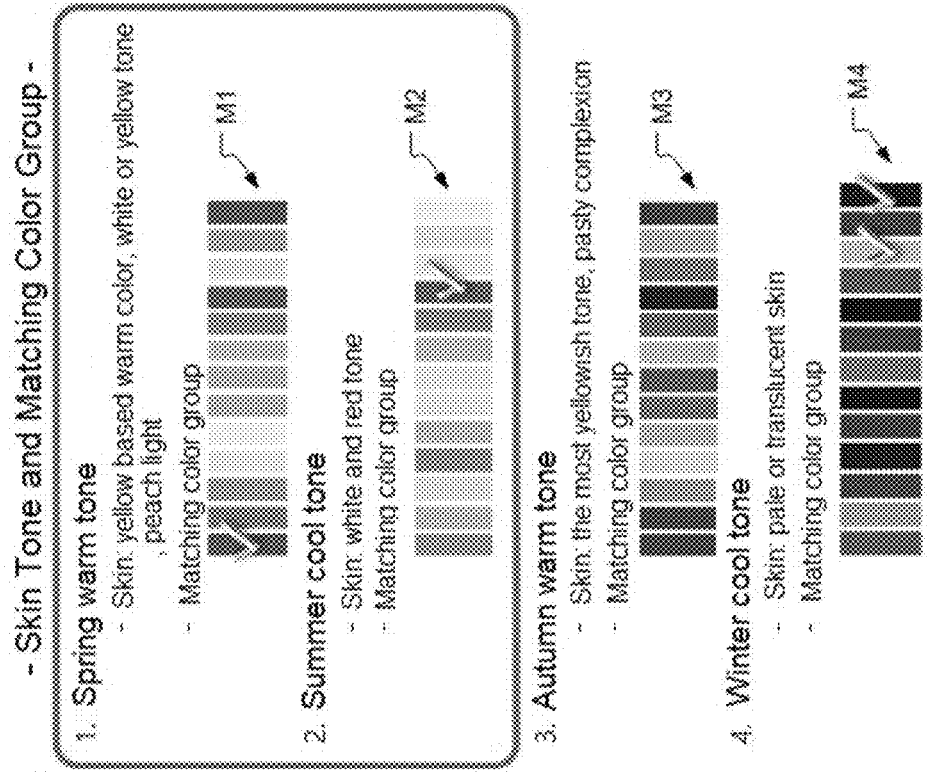
FIG. 4 illustrates the comparison of the color of the clothing with a skin-tone-matching color table, according to an embodiment of the present invention.

Referring to FIG. 4, there is shown a method of extracting matching information between the colors of the clothing 20a, 20b, 20c, 20d, and 20e worn by the user and the skin tone 15.

This may be done by comparing the color groups M1 and M2 matched to the skin tone 15 classified above (see FIG. 3) and the colors of the clothing worn by the user 20a, 20b, 20c, 20d, and 20e. The deep learning algorithm used in this case has learned colors that match various skin tones (e.g., four tones). In addition, the matching can be accomplished by deep learning techniques even when the various skin tones are not completely matched with previously entered data.

As a result, the red stripped short-sleeved T-shirt 20a was matched to one color (checked) of the color group M1, and the blue short sleeves check shirt 20b was matched to one color (checked) of the color group M2. The navy blue suit vest 20c and the gray slim fit slacks 20d were each matched to the color group M4 which was not matched to the skin tone 15 of the user.

It was determined that white slip-on shoes 20e were also matched to skin tone 15 by applying a criterion that white color matches all colors (i.e., white=default matching). As a result, matching information that three out of the clothes worn by the user have colors matching the skin tone is extracted (i.e., the number of clothes having a color matching the skin tone=3).

Figure 5:
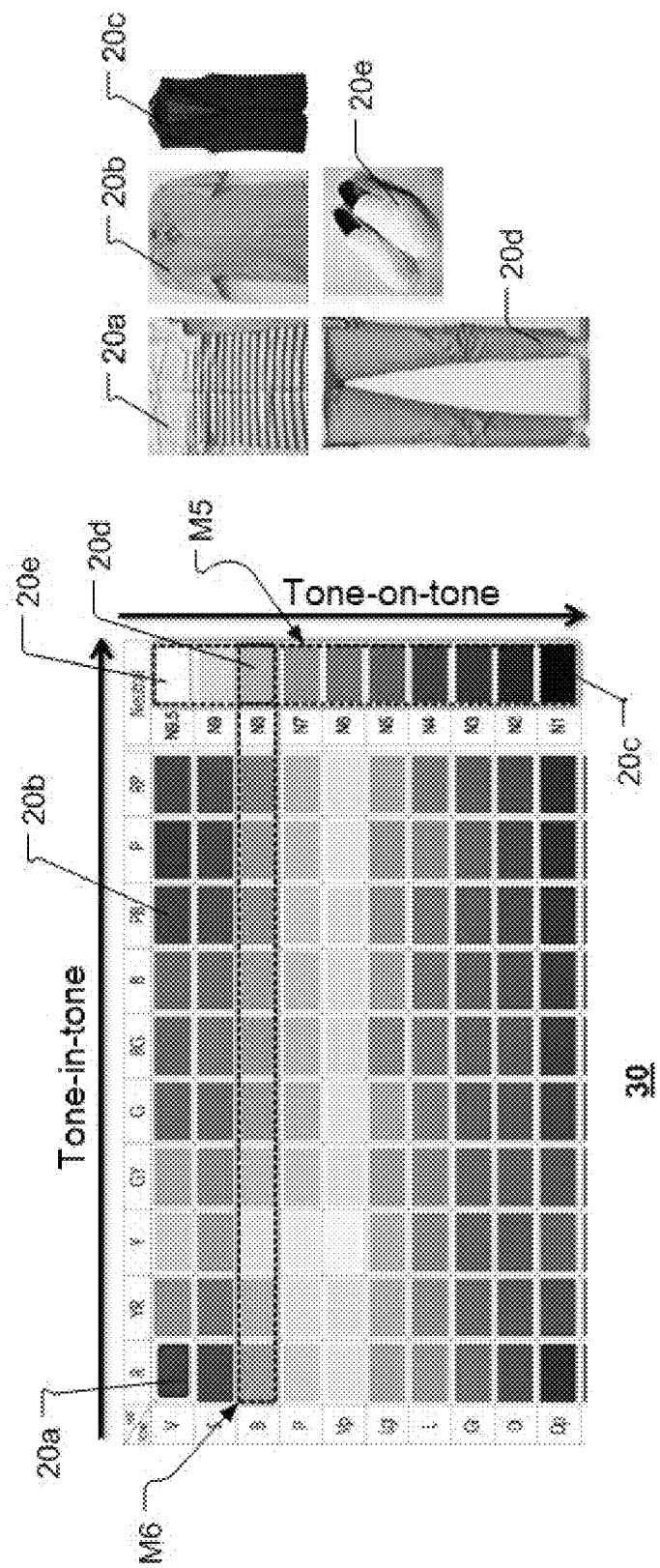
FIG. 5 illustrates the determination of whether or not colors are matched among the clothes worn by the user, according to an embodiment of the present invention.

FIG. 5 illustrates extraction of matching information between colors of clothing worn by the user, according to an embodiment of the present invention.

In extracting matching information between colors, the above-mentioned concept of tone may be used. As is well known, all colors have three attributes: hue, saturation, and brightness. The tone is used to refer to the concept incorporating saturation and brightness out of the three attributes. In other words, 'tone' indicates the brightness and darkness, lightness and deepness, and murkiness and pureness of colors comprehensively, and it is also called 'shade' or 'impression of color'.

Further, 'tone-on-tone' and 'tone-in-tone' will be discussed.

'Tone-on-tone' refers to a gradation from the brightest and lightest color to the darkest and deepest color in one color. A color combination such as wearing beige with brown color or blue with navy can be a tone-on-tone. In other words, totally different colors are not used.

'Tone-in-tone' is made up of colors with similar brightness or density, but it does not matter if the colors are different. Pastel tone is a good example of tone-in-tone.

Tone-on-tone fashion, based on the coordination with similar colors, gives a sense of unity, calmness, and sophistication. On the contrary, tone-on-tone fashions could seem complicated because they are mixed in different colors, but they can give a feeling of liveliness by coordinating tones of not too many colors.

The matching information of the colors between the clothing worn by the user can be extracted using the deep learning algorithm in which the reference color chart 30 relating to the tone-on-tone and tone-in-tone as described above was learned. In the color chart 30 of FIG. 5, the vertical direction corresponds to tone-on-tone, and the horizontal direction corresponds to tone-in-tone.

In order to determine whether the tone is matched based on tone-on-tone and tone-in-tone concept, a reference color should be designated. In the embodiment shown in FIG. 5, the color of the bottoms, i.e., the gray slim-fit slacks 20d were used as the reference color.

In this way, the color group M5 represents the tone-on-tone matching color group, and the color group M6 represents the tone-in-tone matching color group.

The clothing belonging to these color groups M5 and M6 are the dark blue suit vest 20c and the white slip-on shoes 20e in addition to the gray slim fit slacks 20d. They all correspond to tone-on-tone matching.

As a result, matching information indicating that three of the clothes worn by the user have colors that match each other (i.e., the number of colors matching between clothes=3).

Figure 6:
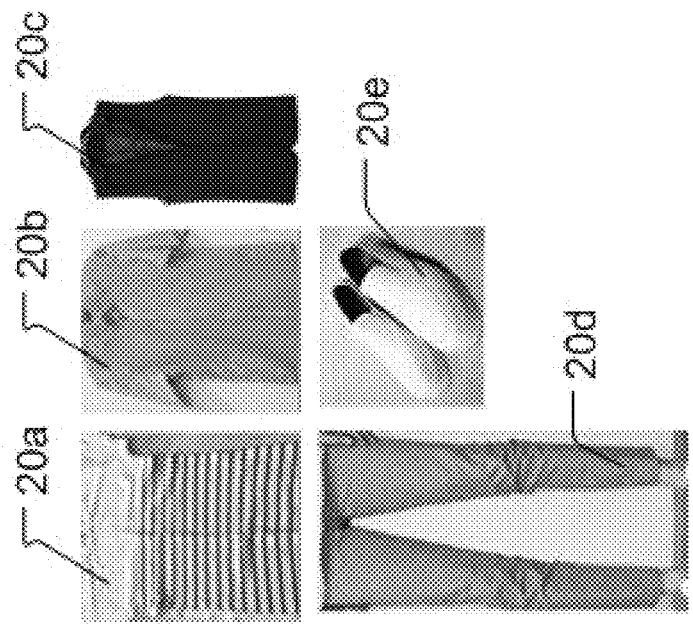
FIG. 6 illustrates the determination of whether or not styles are matched among the clothes worn by the user, according to an embodiment of the present invention.

FIG. 6 illustrates extraction of a matching information between clothing worn by the user, according to an embodiment of the present invention.

In this step, matching information of clothing styles can be extracted between the clothing worn by the user 20a, 20b, 20c, 20d and 20e using a deep learning algorithm in which various clothing styles are learned for each clothing. In this embodiment, information regarding A. Natural look, B. Vintage look, C. Modern look, D. Sporty look, E. Outdoor look, F. Dandy Look, G. Military look, and H. School look is deep-learned as clothing styles, and the styles of the clothing worn by the user are judged based on this. It is also possible that one piece of clothing corresponds to plural styles.

As a result, it was determined that the wearing clothing 20a, 20b, 20c, 20d, and 20e had three clothing styles, namely, A. natural look, C. modern look, and F. dandy look. The clothing 20b and 20e corresponded to two styles, respectively.

In the clothing evaluation, the less the number of styles of the clothing worn by the user is, the higher the evaluation score is obtained. In other words, it is advantageous that the clothing style has as much unity as possible.

In this embodiment, matching information is extracted that the clothing worn by the user includes a total of three clothing styles (i.e., the number of clothing styles=3).

Hereinafter, a method of calculating an evaluation score according to each evaluation item according to one embodiment of the present invention will be described.

Referring to FIGS. 4 to 6 illustrating an embodiment of the present invention, the following matching information has been extracted.

The number of clothing having a color matching the skin tone=3;

The number of colors matching between the clothing=3;

The total number of styles of the clothing=3.

The above matching information is referred to as evaluation items 1 to 3, and for the evaluation items 1 and 2, the higher the number is, the higher the score is, and for the evaluation item 3, the lower the number is, the higher the score is (See FIG. 7).

$$(a/N) \times (1/E) \times 100 \qquad \text{Evaluation item 1}$$

$$(b/N) \times (1/E) \times 100 \qquad \text{Evaluation item 2}$$

$$(N-c+1)/N \times (1/E) \times 100 \qquad \text{Evaluation item 3}$$

Total score=evaluation item 1+evaluation item 2+evaluation item 3

(N: the number of clothing worn by the user, E: the total number of evaluation items, a: the number of clothing having a color matching user's skin tone, b: the number of colors matching among the clothing worn by the user, c: the total number of styles of clothing worn by the user)

When the matching information extracted in this embodiment is put into the above equations, the score of each evaluation item is as follows.

$$(a/N) \times (1/E) \times 100 = (3/5) \times (1/3) \times 100 = 20 \qquad \text{Evaluation item 1}$$

$$(b/N) \times (1/E) \times 100 = (3/5) \times (1/3) \times 100 = 20 \qquad \text{Evaluation item 2}$$

$$(N-c+1)/N \times (1/E) \times 100 = (5-3+1)/5 \times (1/3) \times 100 = 20 \qquad \text{Evaluation item 3}$$

Therefore, the total score of the clothing style evaluation on the clothing worn by the user is 60 points.

Clothing coordination evaluation based on deep learning can be done as above.

Furthermore, the clothing coordination can be recommended on the basis of the deep learning-based information utilized in the above-mentioned coordination evaluation.

This may be automatically performed when the above-mentioned coordination evaluation score falls short of a predetermined reference value or may be performed according to the request of the user.

Figure 8:
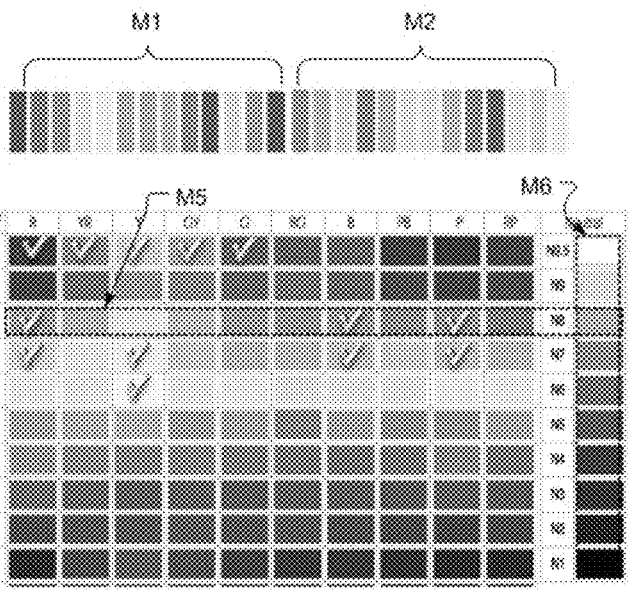
FIG. 8 illustrates the recommendation of a clothing style to a user, according to an embodiment of the present invention.
Figure 8:
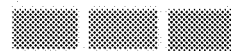
Figure 8:
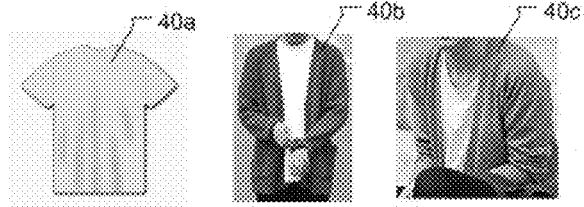
Figure 8:
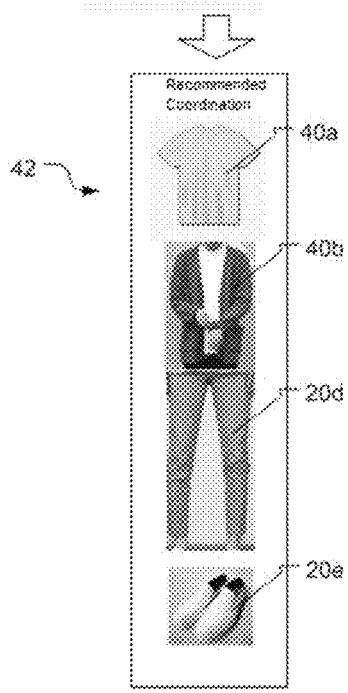

FIG. 8 illustrates a method of recommending a clothing style to a user in accordance with an embodiment of the present invention.

First, among the colors included in the skin tone-matching color groups M1 and M2, colors belonging to the tone-on-tone and tone-in-tone matching color groups M5 and M6 were detected. In FIG. 8, colors belonging to the color chart 30 among the color groups M1 and M2 were checked and displayed. Among them, three colors belonging to the color group M5 were detected.

Then, the clothing 40a, 40b and 40c corresponding to the above three colors and also corresponding to the most frequent style currently worn, in this case, Dandy look can be recommended. By combining this recommendable clothing with the previously detected clothing worn by the user, a recommended clothing coordination 42 can be displayed.

As described above, according to the present invention based on the deep learning method, it is not necessary for a person to intervene until the clothing style evaluation is accomplished, so that an objective and consistent evaluation can be provided. In addition, it is possible to immediately provide a recommended clothing or recommended clothing coordination to the user.

As described above, a method and system for evaluating clothing style based on deep learning have been described according to an embodiment of the present invention. It will be apparent to those skilled in the art that various modifications and variations can be made in the present invention without departing from the spirit and scope of the invention as defined in the appended claims.

| | |
|---|---|
| 3: server | 5: telecommunication network |
| 10: administrator terminal | 11: user terminal |
| 12: fashion feature | 15: skin tone |
| 20a, 20b, 20c, 20d, 20e: clothing worn by the user | |
| M1, M2, M3, M4, M5, M6: color group | |
| 30: color chart | 40a, 40b, 40c: recommended clothing |
| 42: recommended clothing coordination | |

What is claimed is:

1. Deep learning-based clothing style evaluation method, comprising:
   receiving at least one image provided by a user terminal;
   analyzing objects included in the at least one image, and extracting a plurality of fashion features related to a user using deep learning algorithm when the user exists in the object;
   extracting matching information between the extracted plurality of fashion features using deep learning algorithm;
   evaluating a clothing style of the user based on the matching information; and
   transmitting an evaluation result to the user terminal,
   wherein the fashion feature is a skin tone of the user and one of the number of clothing worn by the user, type of clothing, color of clothing, style of clothing, and other information affecting fashion style,
   wherein the matching information comprises essentially of matching information between the skin tone of the user and one of the number of clothing worn by the user, type of clothing, color of clothing, style of clothing, and other information affecting fashion style,
   wherein the matching information includes matching information between the color of the clothing worn by the user and the skin color of the user, and
   wherein the extracting of the skin tone includes classifying the user's skin tone according to a predetermined skin tone classification criterion and retrieving at least one color group matching the extracted skin tone.

2. The method of claim 1, wherein the matching information includes information on the style of the clothing worn by the user.

3. The method of claim 1, wherein the extracting of the matching information between the color of the clothing worn by the user and the user's skin tone is performed by comparing the color of the clothing worn by the user with the color group matching the extracted skin tone.

4. Deep learning-based clothing style evaluation method, comprising:
   receiving at least one image provided by a user terminal;
   analyzing objects included in the at least one image, and extracting a plurality of fashion features related to a user using deep learning algorithm when the user exists in the object;
   extracting matching information between the extracted plurality of fashion features using deep learning algorithm;
   evaluating a clothing style of the user based on the matching information; and
   transmitting an evaluation result to the user terminal,
   wherein the fashion feature is a skin tone of the user and one of the number of clothing worn by the user, type of clothing, color of clothing, style of clothing, and other information affecting fashion style,
   wherein the matching information comprises essentially of matching information between the skin tone of the user and one of the number of clothing worn by the user, type of clothing, color of clothing, style of clothing, and other information affecting fashion style,
   wherein the matching information includes matching information between the color of the clothing worn by the user and the skin tone of the user,
   wherein the matching information includes matching information between colors of two or more pieces of clothing worn by the user, and
   wherein the extracting of the matching information between the colors of two or more pieces of clothing worn by the user is accomplished by determining whether a tone-on-tone or tone-in-tone matching exists based on a color of one piece of clothing designated from the clothing worn by the user in a predetermined color chart.

5. Deep learning-based clothing style evaluation method, comprising:
   receiving at least one image provided by a user terminal;
   analyzing objects included in the at least one image, and extracting a plurality of fashion features related to a user using deep learning algorithm when the user exists in the object;
   extracting matching information between the extracted plurality of fashion features using deep learning algorithm;
   evaluating a clothing style of the user based on the matching information; and
   transmitting an evaluation result to the user terminal,
   wherein the fashion feature is a skin tone of the user and one of the number of clothing worn by the user, type of clothing, color of clothing, style of clothing, and other information affecting fashion style,
   wherein the matching information comprises essentially of matching information between the skin tone of the user and one of the number of clothing worn by the user, type of clothing, color of clothing, style of clothing, and other information affecting fashion style, and
wherein the evaluating of the clothing style includes calculating a total score by putting one or more of the number of clothing having a color matching the skin tone, the number of colors matches between clothing and the total number of clothing styles into a predetermined equation.

6. The method of claim 5, wherein the predetermined equation is Total score=$\{(a/N)\times(1/E)\times100\}+\{(b/N)\times(1/E)\times100\}+\{(N-c+1)/N\times(1/E)\times100\}$, where N: the number of clothing worn by a user, E: the number of evaluation items, a: the number of clothing having a color matching a skin tone of a user, b: the number of color matches between clothing worn by the user, and c: the total number of styles of clothing worn by the user.

7. Deep learning-based clothing style evaluation method, comprising:
receiving at least one image provided by a user terminal;
analyzing objects included in the at least one image, and extracting a plurality of fashion features related to a user using deep learning algorithm when the user exists in the object;
extracting matching information between the extracted plurality of fashion features using deep learning algorithm;
evaluating a clothing style of the user based on the matching information;
transmitting an evaluation result to the user terminal,
wherein the fashion feature is a skin tone of the user and one of the number of clothing worn by the user, type of clothing, color of clothing, style of clothing, and other information affecting fashion style, and
wherein the matching information comprises essentially of matching information between the skin tone of the user and one of the number of clothing worn by the user, type of clothing, color of clothing, style of clothing, and other information affecting fashion style;
extracting a recommended clothing using deep learning algorithm based on the evaluation result or at the request of the user;
transmitting the recommended clothing to the user terminal,
wherein the extracting of the recommended clothing includes loading a tone-on-tone matching color group and a tone-in-tone matching color group in a predetermined color chart based on a color of one piece of clothing designated from the clothing worn by the user;
selecting at least one recommended color by comparing the color groups with a color group matching the skin tone of the user; and
selecting a most frequent style among the styles of the clothing worn by the user as a recommended clothing style.

8. Deep learning-based clothing style evaluation system, comprising
a server receiving at least one image provided by a user terminal; and
a deep learning unit linked to the server,
wherein the deep learning unit analyzes an object included in the at least one image, extracts a plurality of fashion features related to a user by using deep learning algorithm when the user exists in the object, extracts matching information between the plurality of fashion features, and evaluates clothing style of the user based on the matching information,
wherein the fashion feature is a skin tone of the user and one of the number of clothing worn by the user, type of clothing, color of clothing, style of clothing, and other information affecting fashion style,
wherein the matching information comprises essentially of matching information between the skin tone of the user and one of the number of clothing worn by the user, type of clothing, color of clothing, style of clothing, and other information affecting fashion style,
wherein the matching information includes matching information between the color of the clothing worn by the user and the skin tone of the user, and
wherein extracting of the skin tone includes classifying the user's skin tone according to a predetermined skin tone classification criterion and retrieving at least one color group matching the extracted skin tone.

9. The system of claim 8, wherein the matching information includes information on the style of the clothing worn by the user.

10. The system of claim 8, wherein extracting of the skin tone includes classifying the user's skin tone according to a predetermined skin tone classification criterion and retrieving at least one color group matching the extracted skin tone.

11. The system of claim 10, wherein the extracting of the matching information between the color of the clothing worn by the user and the user's skin tone is performed by comparing the color of the clothing worn by the user with the color group matching the extracted skin tone.

12. Deep learning-based clothing style evaluation system, comprising
a server receiving at least one image provided by a user terminal; and
a deep learning unit linked to the server,
wherein the deep learning unit analyzes an object included in the at least one image, extracts a plurality of fashion features related to a user by using deep learning algorithm when the user exists in the object, extracts matching information between the plurality of fashion features, and evaluates clothing style of the user based on the matching information,
wherein the fashion feature is a skin tone of the user and one of the number of clothing worn by the user, type of clothing, color of clothing, style of clothing, and other information affecting fashion style,
wherein the matching information comprises essentially of matching information between the skin tone of the user and one of the number of clothing worn by the user, type of clothing, color of clothing, style of clothing, and other information affecting fashion style,
wherein the matching information includes matching information between the color of the clothing worn by the user and the skin tone of the user,
wherein the matching information includes matching information between colors of two or more pieces of clothing worn by the user, and
wherein the extracting of the matching information between the colors of two or more pieces of clothing worn by the user is accomplished by determining whether a tone-on-tone or tone-in-tone matching exists based on a color of one piece of clothing designated from the clothing worn by the user in a predetermined color chart.

13. Deep learning-based clothing style evaluation system, comprising:
a server receiving at least one image provided by a user terminal; and
a deep learning unit linked to the server, wherein the deep learning unit analyzes an object included in the at least one image, extracts a plurality of fashion features related to a user by using deep learning algorithm when the user exists in the object, extracts matching information between the plurality of fashion features, and evaluates clothing style of the user based on the matching information, wherein the fashion feature is a skin tone of the user and one of the number of clothing worn by the user, type of clothing, color of clothing, style of clothing, and other information affecting fashion style, wherein the matching information comprises essentially of matching information between the skin tone of the user and one of the number of clothing worn by the user, type of clothing, color of clothing, style of clothing, and other information affecting fashion style, and wherein the evaluating of the clothing style includes calculating a total score by putting one or more of the number of clothing having a color matching the skin tone, the number of colors matches between clothing and the total number of clothing styles into a predetermined equation.

14. The system of claim 13, wherein the predetermined equation is Total score=$\{(a/N)\times(1/E)\times100\}+\{(b/N)\times(1/E)\times100\}+\{(N-c+1)/N\times(1/E)\times100\}$, where N: the number of clothing worn by a user, E: the number of evaluation items, a: the number of clothing having a color matching the user's skin tone, b: the number of color matches between the clothing worn by the user, and c: the total number of styles of the clothing worn by the user.

15. Deep learning-based clothing style evaluation system, comprising:

a server receiving at least one image provided by a user terminal;

a deep learning unit linked to the server, wherein the deep learning unit analyzes an object included in the at least one image, extracts a plurality of fashion features related to a user by using deep learning algorithm when the user exists in the object, extracts matching information between the plurality of fashion features, and evaluates clothing style of the user based on the matching information, wherein the fashion feature is a skin tone of the user and one of the number of clothing worn by the user, type of clothing, color of clothing, style of clothing, and other information affecting fashion style, and wherein the matching information comprises essentially of matching information between the skin tone of the user and one of the number of clothing worn by the user, type of clothing, color of clothing, style of clothing, and other information affecting fashion style;

extracting a recommended clothing using deep learning algorithm based on the evaluation result or at the request of the user;

transmitting the recommended clothing to the user terminal, wherein the extracting of the recommended clothing includes loading a tone-on-tone matching color group and a tone-in-tone matching color group in a predetermined color chart based on the color of one piece of clothing designated from the clothing worn by the user;

selecting at least one recommended color by comparing the color groups with a color group matching the skin tone of the user;

selecting a most frequent style among the styles of the clothing worn by the user as a recommended clothing style.

* * * * *